United States Patent [19]

Gastouniotis et al.

[11] Patent Number: 4,940,976
[45] Date of Patent: Jul. 10, 1990

[54] AUTOMATED REMOTE WATER METER READOUT SYSTEM

[75] Inventors: Constantine S. Gastouniotis; Nuno Bandeira; Kitchener C. Wilson, all of Santa Barbara, Calif.

[73] Assignee: Utilicom Inc., Santa Barbara, Calif.

[21] Appl. No.: 152,960

[22] Filed: Feb. 5, 1988

[51] Int. Cl.$^5$ .................... G01R 11/00; G01F 1/075
[52] U.S. Cl. .................... 340/870.02; 340/870.31; 340/870.03; 73/861.77; 136/205; 324/157
[58] Field of Search .................... 310/306, 307; 73/861.77, 861.78, 272 A; 324/157, 137; 340/870.02, 870.03, 870.31, 870.07; 136/205, 240

[56] References Cited

U.S. PATENT DOCUMENTS 4,253,341 3/1981 Ikeda et al. .................... 73/861.77
4,749,992 6/1988 Fitzemeyer et al. ............ 340/870.02

Primary Examiner—Parshotam S. Lall
Assistant Examiner—Tyrone Queen
Attorney, Agent, or Firm—Donald A. Streck

[57] ABSTRACT

An automated multi-purpose utility water meter readout system. The disclosed system obtains water usage information from an existing water meter without any modifications or attachments to the meter. The device needs only to be located in proximity to the water meter and obtains water flow information by sensing the magnetic flux lines generated by the internal rotating coupling magnets of the water meter. The varying magnetic flux is converted to a periodic electrical signal whose frequency is proportional to the flow rate. The instantaneous flow is continually totalized and stored in a solid-state counter, from which the totalized flow information is periodically transmitted to a remote receiver by a standard, well-proven radio frequency telemetry link. The remote receiver stores data from multiple meters (up to 10,000) and periodically sends the data to the data processing office by means of telephone lines, CATV cable, or RF link. As an option, the system offers a feature that can provide direct benefits to the water user, i.e. an interface unit located in the user's residence receives water use data from the meter and displays this data to aid in water conservation and provide warnings of water leaks. The disclosed system is optionally powered by a novel solid-state thermoelectric generator which converts ambient thermal energy to electrical energy and provides an operational life that far exceeds the economic life of the device.

33 Claims, 6 Drawing Sheets

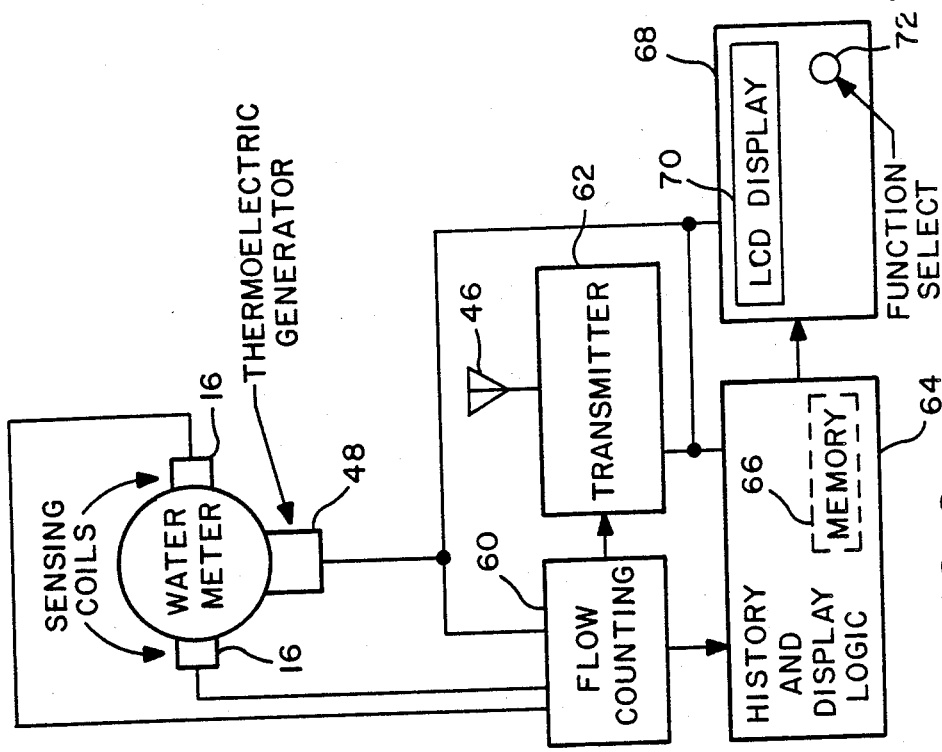
FIG. 9
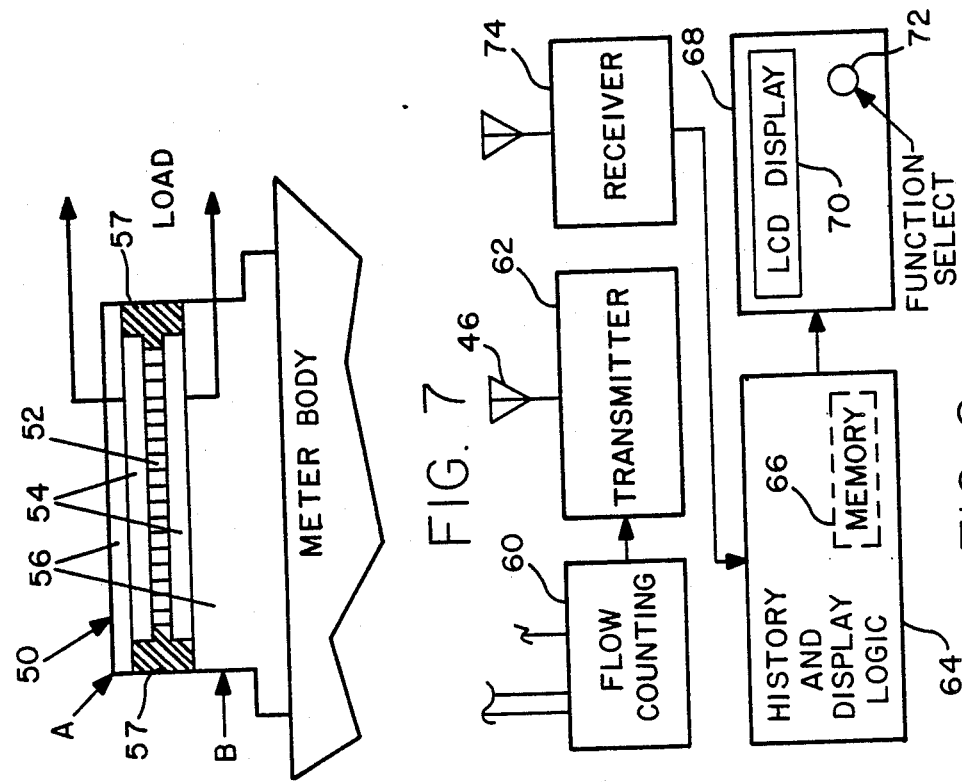
FIG. 7
FIG. 8

AUTOMATED REMOTE WATER METER READOUT SYSTEM

BACKGROUND OF THE INVENTION

This invention relates to automated utility water meter reading systems and, more particularly, to a self-powered system that allows remote meter readout without modification of the existing water meter. In particular, it relates to a self-powered sensor/transmitter unit adapted for attachment to a water meter for transmitting water consumption data so as to allow remote reading of the meter comprising, sensor means for sensing a component of the water meter moving in proportion to the rate of water consumption and for providing a signal proportional to the rate of movement of the component; consumption calculation means connected to receive the signal for producing a binary count of the water consumption; and, transmitter means for transmitting the binary count.

At present, systems designed for automatic water meter readout require replacement of the existing conventional water meter or extensive modifications to it. Installation is cost- and labor-intensive and requires temporary shutoff of service to the customer. Labor costs are further increased by the requirements that the meter be connected to a power source and that cabling be installed to carry the meter signal to a telephone or CATV interface unit for each meter. These requirements present a particularly significant problem in the Western United States and other parts of the country where water meters are most often located inside a pit near the street curb, away from a power source and some distance from the dwelling. Extensive trenching and restoration of landscape or surfacing materials is required, making the large-scale adoption of automated systems cost prohibitive to the point of impracticality.

Wherefore, it is the object of the present invention to provide an automatic meter reading system for water meters, and the like, which is cheap and easy to install on existing equipment without modification thereof.

It is another object of the present invention to provide an automatic meter reading system for water meters, and the like, which can be located remote from the building to which it relates and requires no power source for operation.

It is yet another object of the present invention to provide an automatic meter reading system for water meters, and the like, which can transmit data for a large number of meters from a single telephone, CATV, or RF interface point.

Other objects and benefits of the present invention will become apparent from the description which follows hereinafter when taken in conjunction with the drawings which accompany it.

SUMMARY

The foregoing objects have been achieved by the sensor/transmitter unit of the present invention which is adapted for mounting in association with a water meter measuring consumption of water wherein such water meter includes a coupling magnet producing a magnetic field rotating at a rate proportional to the water consumption rate and further adapted for transmitting consumption data for remote reading of the meter wherein the unit comprises, magnetic flux sensor means for providing a signal proportional to the rate of rotation of the magnetic field; consumption calculation means connected to receive the signal for producing a binary count of the water consumption; and, transmitter means for wirelessly transmitting the binary count to a local unit serving multiple units.

In the preferred embodiment, the local unit includes receiver means for receiving the wirelessly transmitted binary count and for re-transmitting the received binary count to a central site using the data. In one version, the receiver means includes modem means for transmitting the received binary count to the central site by means of telephone lines. In another version, the receiver means includes modem means for transmitting the received binary count to the central site by means of a CATV cable. In still another version, the receiver means includes RF modem means for transmitting the received binary count to the central site by means of a radio frequency link.

Further in the preferred embodiment, there are consumer consumption information display means for receiving and keeping a history of water consumption and for calculating and displaying consumption information from the history upon request.

One embodiment is also made self-powering by the addition of thermoelectric generation means for providing power to the consumption calculation means and the transmitter means from changes in temperature at the location of the consumption calculation means and the transmitter means. The preferred thermoelectric generation means includes, a plurality of thermoelectric elements disposed between a pair of contact plates in series electrically and in parallel thermally; a first heat sink member thermally connected to one of the pair of contact plates; and, a second heat sink member thermally connected to the other of the pair of contact plates, the second heat sink member being of a different mass than the first heat sink member. For preferred operation, the second heat sink member is thermally attached to the body of the meter whereby the body of the meter acts as an additional heat sink to the other of the pair of contact plates.

DESCRIPTION OF THE DRAWINGS

FIG. 7 is an enlarged, partially cutaway drawing of the thermoelectric module employed in the thermoelectric generator of FIG. 6.

FIG. 8 is a block diagram showing a preferred arrangement wherein the consumer information display portion is located away from the flow sensing unit and receives the data employed therein from the RF transmission thereof as transmitted by the flow sensing unit.

FIG. 9 is an alternate approach to the embodiment of FIG. 8 wherein the history and display logic and display are located adjacent to the flow sensing unit and powered by a common thermoelectric generator.

DESCRIPTION OF THE PREFERRED EMBODIMENT

Figure 1:
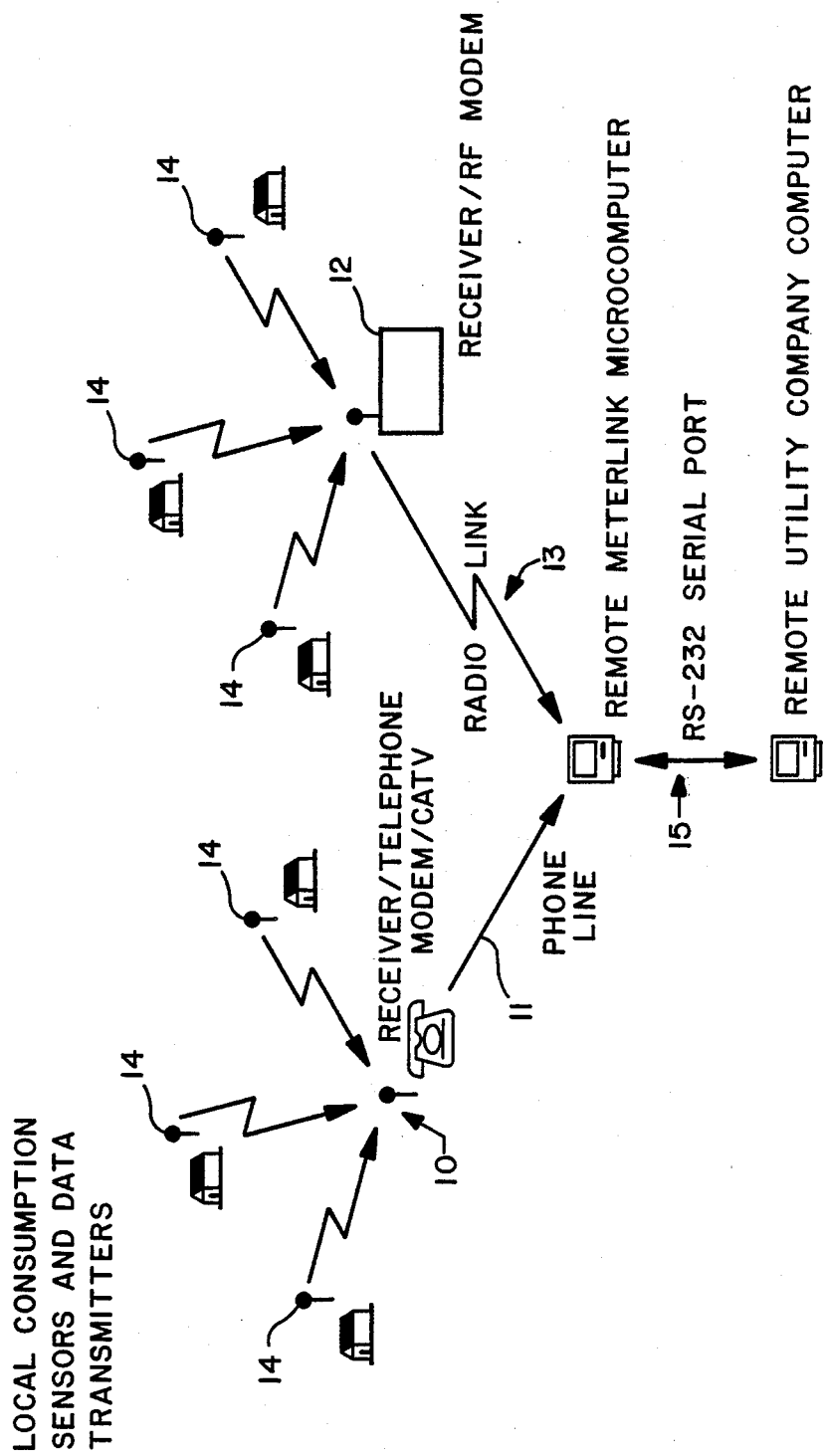
FIG. 1 is a simplified drawing of the environment of the present invention depicting the two basic modes of data sensing and transmission to a central billing site.

The present invention provides an automatic utility water meter reading system which overcomes the prior art's disadvantages and limitations and offers additional features non-existent in the prior art by providing the following features: (1) The system makes use of existing capital equipment already in place. No replacement or alteration of the existing conventional water meter is required. Flow information is obtained through a reliable magnetic link to the existing water meter; (2) The sensing/transmitting unit requires no connection to an external power source. Because of the novel micropower design and advanced power management techniques, overall power quiescent consumption is only 90 microwatts, making it practical to power the system by an internal battery or bi-thermal energy conversion. Thermal energy conversion is performed by a very long-life static solid-state thermoelectric generator consisting of bismuthtelluride thermocouples. Under normal conditions, the generator produces orders of magnitude more power than the unit requires, thus allowing reliable operation under the most adverse ambient thermal conditions; (3) The unit requires no cabling (hard wiring) for data transfer. Data is transferred via a standard, well-proven, low-power RF telemetry link; (4) The system of the present invention provides two primary modes for data transfer from the interfacing data collection station to the central data processing point as illustrated in FIG. 1. In the first mode, data transfer as originally transmitted wirelessly from multiple sensor units 14 and received by a single receiver/telephone modem 10 takes place over phone lines 11 (alternatively, a CATV cable can be used in place of the phone lines 11). In the second mode, which is an alternative to the first, data transfer as originally transmitted wirelessly from the multiple sensor units 14 and received by the single receiver/RF modem 12 takes place over a half-duplex RF link generally indicated as 13. The RF transmission can be received by an appropriate receiver at the central billing site or by mobile utility company equipment (i.e. hand held or automobile/truck mounted). In either mode, data transfer can be initiated either by the interface unit (i.e. modem 10 or 12) or by the data processing station 15 of the billing site receiving the transmitted data by means of appropriate receiving apparatus. A third mode of operation is available as a supplement to either of the foregoing primary modes and is provided for the benefit of the home owner, i.e. data from the meter sensor/transmitter can be received and displayed by an informational unit installed inside the customer's home or other building. This feature provides a variety of information to aid in water conservation in areas where water supplies are limited. Such information could include water consumption at any time during the day, week, or month, or comparative data on water usage for previous periods (day, week, month, etc.). In addition, the device could provide warning of a prolonged water leak or excessive water usage; and, (5) Ease of installation, which was major design objective. It should take no more than a few minutes for a skilled person to install the unit in a water meter pit, in contrast with the hours of labor required for existing systems. Finally, as will be appreciated by those skilled in the art, while the primary thrust of the present invention is in the improvement of water meter reading systems, many of the novel aspects of the present invention could be incorporated into other related fields and, therefore, it is the applicants' intent that of the disclosure and the claims appended hereto be accorded a breadth within the scope and spirit of the invention and not be limited to the specific embodiment to be described by way of example.

The most important aspect of the present invention over the prior art is that the present invention can service as many as 10,000 water meters from a single interfacing modem unit serving a local area whereas the prior art employs a single modem unit for each meter. Those skilled in the art will recognize instantly the cost saving implications of this feature of the present invention. The preferred mode of operation for the system of the present invention is for the sensing and transmitting units located at the meters to randomly send bursts of consumption data throughout the day to the receiving interface unit for the area. This data for the units being serviced is accumulated in memory provided in the interface unit. Periodically or on demand, the interface unit disgorges its consumption history information for the central billing site. At present, the sensing and transmitting units are set to send 128 bits of information (64 bits of data and a 64 bit unit identification header) at 1600 bits/sec. in each burst. Based on transmission collision probability minimization, at the above rate, the probability of at least one successful transmission per day does not begin to fall off significantly until after as many as 10,000 units are all transmitting to the same interfacing unit. Thus, it is assumed that 10,000 individual water meters can be serviced by a single interfacing unit without problems. While the use of multiple transmissions from the sensing units can increase the probability of a successful transmission and, therefore, increase the number of units that can be serviced by a single interfacing unit, the practicalities of residential proximity within the approximately three square miles of maximum transmission range for the transmitters makes such large numbers beyond the limits of expected need.

Figure 2:
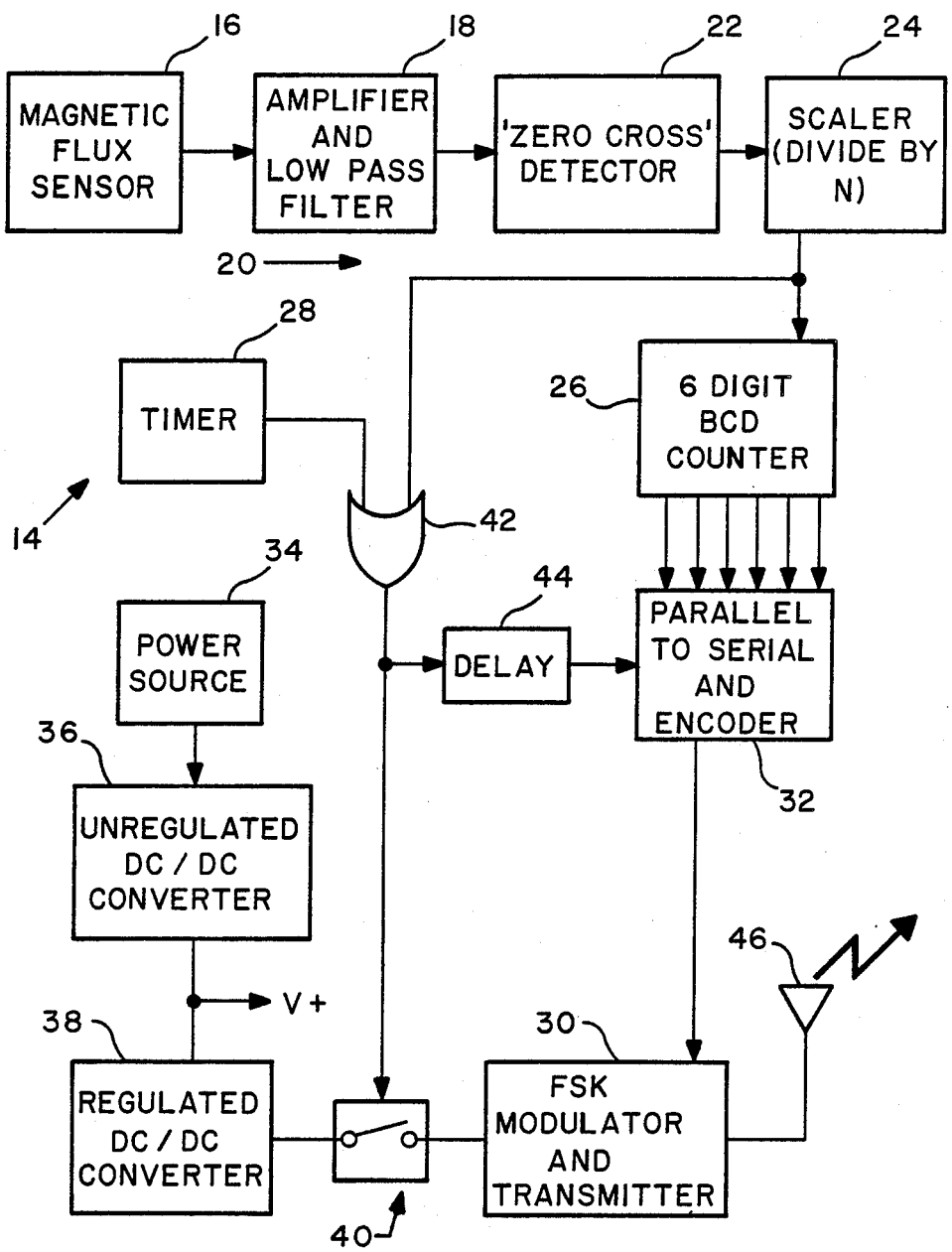
FIG. 2 is a block diagram of the sensing/transmitting unit of the present invention.

The remote flow sensor unit of the present invention is depicted in block diagram form in FIG. 2 wherein it is generally indicated as 14. The primary component of the remote flow sensor unit 14 is a magnetic flux sensor 16 which senses the varying magnetic field produced by the water meter's rotating magnet. It is an ultra-sensitive passive device, requiring no power source, which can sense extremely weak fields at very low frequencies—as low as + or −0.01 Gauss at 0.05 Hz, which represents very low flows (below 0.1 gpm). This passive device was specifically developed for use on the present invention instead of a more conventional Hall-effect sensor, or the like, in order to obtain significant power savings. The power consumption of a Hall effect sensor, even when the sensor is coupled with sophisticated adaptive sampling techniques, is several orders of magnitude greater than that of the entire remote flow sensor unit 14 equipped with its novel passive sensor 16. Furthermore, a Hall-effect sensor can not be made totally tamper-proof, as can the passive sensor 16. The sensor 16 will be described in greater detail later herein.

The signal output of the magnetic flux sensor 16 is fed to an analog signal processing circuit 18 consisting of a high-gain, ultra-low-consumption amplifier and a low-pass filter. The circuit 18 requires less than five microamperes from a six volt DC power source. The filter incorporated therein is an active, low-pass type with a sharp cutoff frequency (25 Hz), making the sensor unit 14 totally immune to magnetic fields generated by high-voltage power distribution lines which may be in the area.

From the analog signal processing circuit 18, the signal enters a flow totalizer, generally indicated as 20, which, in the preferred embodiment, consists of a zero-cross detector 22, a scaling circuit 24, and a six-digit BCD counter 26. The zero-cross detector 22 counts polarity transitions of the amplified input signal, thus effectively counting output pulses from the magnetic flux sensor 16. Counts are converted by the scaling circuit 24 according to the meter size used and the desired units of measurement (gallons, cubic feet, cubic meters, etc.) or for multiples of ten, depending on expected flow rates. Scaling is set by means of a BCD switch (not shown). The scaled output from the scaling circuit 24 is totalized by a six-digit counter 26 which consists of six decade counters with decoded BCD outputs. Thus, totalized flow is represented by a 24-bit word consisting of "0"s and "1"s, with the first four bits representing the least significant digit and the last four bits the most significant digit. Totalized flow readings greater than 999,999 can be accommodated by simple expansion of the counter chain.

The totalized flow data stored in the counter 26 is transmitted through an RF link to a data collection interface unit. This transmission takes place every time the six-digit BCD counter 26 is incremented and periodically at a specified interval, such as once per day, determined by the timer 28. FSK (Frequency Shift Keying) modulator and transmitter 30 is turned on by switch 40 (activated by OR gate 42) just before an RF transmission is to take place. After a short delay by circuit 44, which allows the transmitter 30 to stabilize, the parallel-to-serial converter and encoder 32 is activated. At the input to the converter and encoder 32, a multiplexer sequentially switches the data out of the six-digit BCD counter 26 into an encoder. The encoder serializes the data, using a time code modulation technique, and applies the data to the FSK modulator and transmitter 30. The FSK modulation scheme represents "0"s and "1"s by two different carrier frequencies. This scheme, together with the time code modulation scheme used by the encoder, makes the system of the present invention extremely reliable.

The preferred power source 34 is a novel thermoelectric generator (to be described in detail shortly) whose output passes through DC-to-DC converters 36 and 38 (unregulated and regulated, respectively) to provide the voltages required by the system. Capacitors store the continuous low-current output of the thermoelectric generator and provide the short-term higher-current requirements of the system during transmission. Optionally, an internal battery can be used as the power source 34; because of the very low power consumption of the unit, a battery of an appropriate type would provide a very long life. As indicated previously, the FSK modulator and transmitter 30 are completely powered off except during transmission in order to minimize power consumption.

It should be noted that it is contemplated that the discrete IC design used for testing of the present invention by the inventors will be integrated into a monolithic LSI (Large Scale Integration) device when the system enters mass production. The present invention lends itself to integration into a system comprising only three components: the magnetic flux sensor, a monolithic LSI containing all CMOS circuitry, and a thick-film hybrid incorporating all RF circuitry. Having thus described the sensor unit 14 in general, the specific novel components thereof will now be addressed with particularity. As will be appreciated by those skilled in the art, these components have the potential for independent use outside of the system of the present invention.

Figure 3:
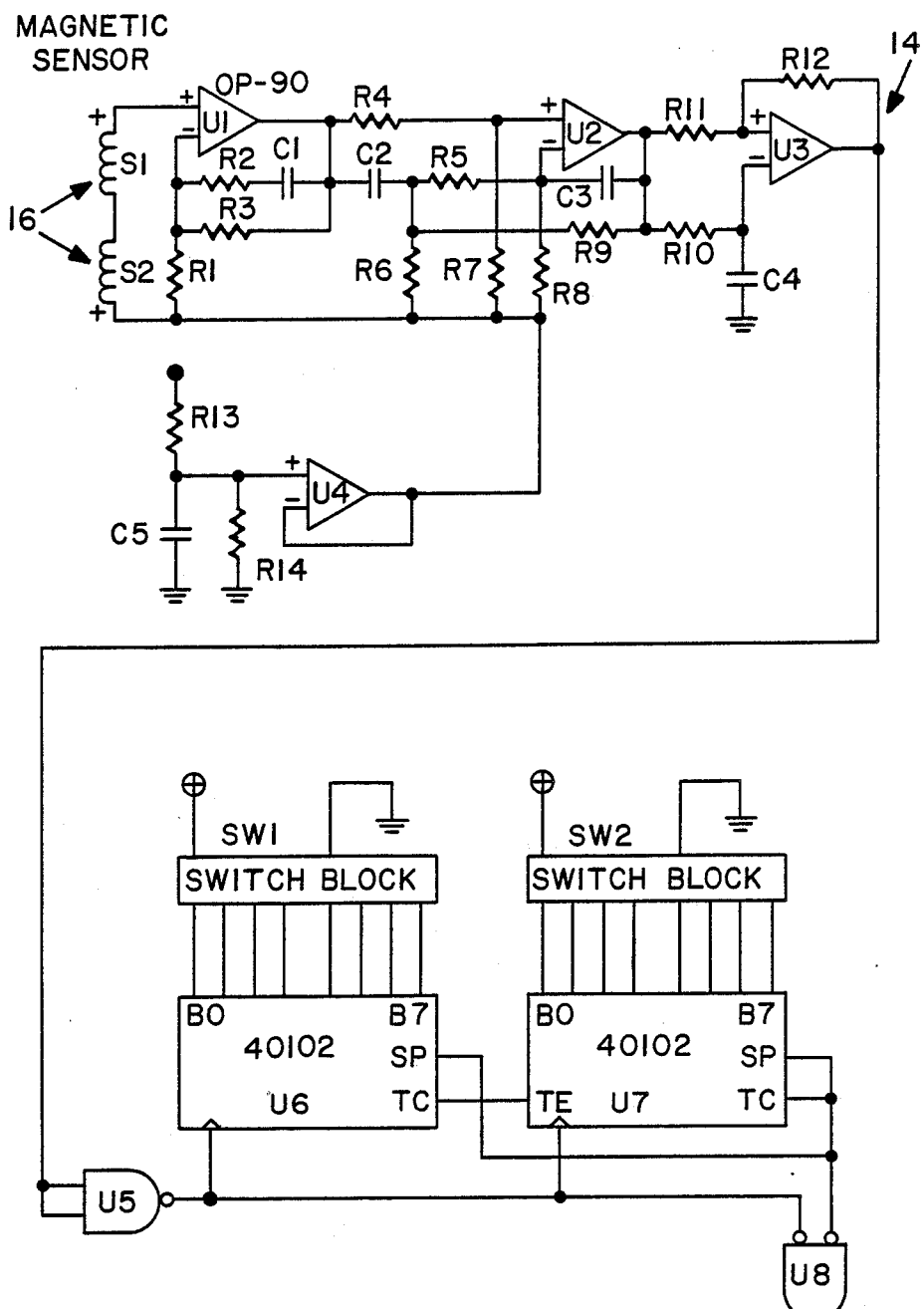
FIG. 3 is a circuit diagram of the magnetic flux sensing and basic signal producing portion of a tested embodiment of the present invention.

The novel magnetic flux sensor 16 of the present invention is capable of sensing reliably the varying magnetic fields produced by the water meter during water flow without requiring insertion into or mechanical coupling to the meter. The circuitry thereof is shown in FIG. 3. The configuration of the case and associated components for physically mounting the circuitry and the magnetic field sensors thereof to a water meter, or the like, with which the sensor 16 is to be associated is readily determinable by those skilled in the art without undue experimentation from the physical construction of the water meter and, therefore, in the interest of simplicity and to avoid redundancy, those aspects of the sensor 16 in its prototype configuration as employed for actual testing will not be described herein. The magnetic flux sensor 16 takes advantage of the internal magnetic system employed in virtually all modern water meters to allow the use of a sealed register for enhanced reliability. Within the meter, the movement of the meter's oscillating piston or disc is magnetically coupled to the geartrain of the sealed register. Two magnets are used by all water meter manufacturers to accomplish this coupling. A driver magnet follows the movement of the piston or disc and magnetically drives a follower magnet located inside the sealed register and coupled to the gear train. The rate of rotation of the follower magnet is proportional to the flow rate. At minimal rates (flow rates that the meter can barely register), rotational frequency is in the range of 0.05 Hz. At maximum flow rates, the rotation may reach 25 Hz. Since water meter cases are typically made of nonmagnetic materials such as brass or thermoplastic (particularly where located in an underground pit), the magnetic field from the rotating driver and follower magnets extends and can be sensed all around the case. Even for a meter encased in a magnetic material, however, the field can be sensed through the glass over the sealed register through which the register is manually read. The inventors herein measured the magnetic field intensity for meters produced by various manufacturers and found it to be in the range of 0.1 2.0 Gauss. From those measurements, it was determined that a very sensitive magnetic sensor immune to electrical and magnetic noise would be needed to sense fields of such magnitude if the system of the present invention was to be operational, reliable, and practical. Additional requirements imposed by the inventors in view of the anticipated operational environment were that the sensor should not consume any power and, furthermore, that it should be tamper-proof. A primary requirement was that the sensor must not be affected by fields external to the meter. These various requirements completely ruled out the use of the prior art, well-known Hall-effect sensor, which has a high power consumption and can be made inoperative by a magnet placed in its proximity.

The novel sensor developed by the inventors herein for the present invention meets all the aboveenumerated requirements and, in fact, consumes no power, consisting as it does entirely of passive components. It is well known that the voltage developed across a conductor subjected to a varying magnetic field is $E = B \times L \times V$; where, E=the AC voltage developed across the conductor, B=the magnet flux density of the field, L=the length of conductor and V=the velocity of the field. In the case of the water meter, V is the rotational speed of the magnet, i.e., $V = r\omega$, where r=radius of rotation and $\omega$=radial frequency. The objective in establishing sensor characteristics is to develop maximum E. Of the variables in the above formula, B and V cannot be increased since they are controlled by the meter's physical configuration; however, L, the length of the conductor, can be increased as required to develop usable voltages. Furthermore, the conductor can be wound around a magnetic flux concentrator such as a steel rod or silicon steel laminate to help develop even higher voltages.

The critical factor in the design of a magnetic sensor for use with a water meter as described above was the requirement of developing usable voltages down to 0.05 Hz, at which rotational rate V of the formula is at its minimum value. Therefore, all design parameters had to be optimized for that case. The sensor 16 used in the present invention consists of 20,000 turns of #46 magnet wire wound on a core of 0.5" diameter by 1.5" length. The voltage developed by this sensor for a water meter with the lowest magnetic flux and the lowest frequencies is as high as 55 millivolts peak-to-peak. Since the sensor 16 is passive, the only internal noise produced is thermal noise, which is orders of magnitude below the lowest signals generated and, therefore, of no concern. As far as externally induced electric or magnetic fields are concerned, the majority of them can be eliminated easily since they are, for the most part, generated by underground or overhead power lines at a 60-Hz frequency. This interference can be removed by notch or low-pass filters, since they are more than an octave above the highest frequency of interest, i.e., 25 Hz.

In the preferred embodiment, interference by strong external far fields which fall within the operational frequency of the sensor, if present, are eliminated by utilizing two sensors 16, labelled S1 and S2, as shown in FIG. 3. The two sensors 16 are placed on opposite sides of the water meter and wired in series, but out of phase. With this arrangement, a far field develops in-phase signals across the sensors 16, which signals are canceled by their out-of-phase wiring. The water meter magnet(s), on the other hand, produce out-of-phase signals in the two sensors 16 since they are on opposite sides of the housing. As a result, the out-of-phase signals are summed to double amplitude by the out-of-phase wiring.

The signals generated by the magnetic flux sensor(s) 16 are amplified and filtered by the amplifier and low-pass filter comprising the analog signal processing circuit 18 which is also shown in detail in FIG. 3. In general the operation of these circuits are well known to those skilled in the art and where no particular novelty is claimed, detailed descriptions of their composition and manner of operation are eliminated in the interest of simplicity and the avoidance of redundancy. The amplifier consists of U1, a micropower op-amp of a type well known in the art and commercially available in a non-inverting configuration. Gain is set by the ratio of resistors R2 to R1 and can be as high as 80 dB with only three microamperes of current consumption. Capacitor C1 provides a pole in the frequency response, causing the gain to fall at six dB/octave. Op-amp U2 and its associated circuitry form an active notch filter tuned at 60 Hz to minimize any interference at that frequency. The zero-cross detector 22 consists of op-amp U3 and associated circuitry in a comparator configuration with zero threshold but a controlled degree of hysteresis. The threshold is set by resistor R10 and capacitor C4, which form a time constant much greater than the lowest frequency of interest. Capacitor C4 charges up to the DC component of U2's output; and, the voltage of C4 will follow any long-term variations due to supply voltage changes or output offset of U2. Desired hysteresis is set by the ratio of resistors R12 and R11. The output of op-amp U3, which consumes only 10 microamperes, is coupled to gate U5, which is employed to improve the rise time of the wave form.

Figure 4:
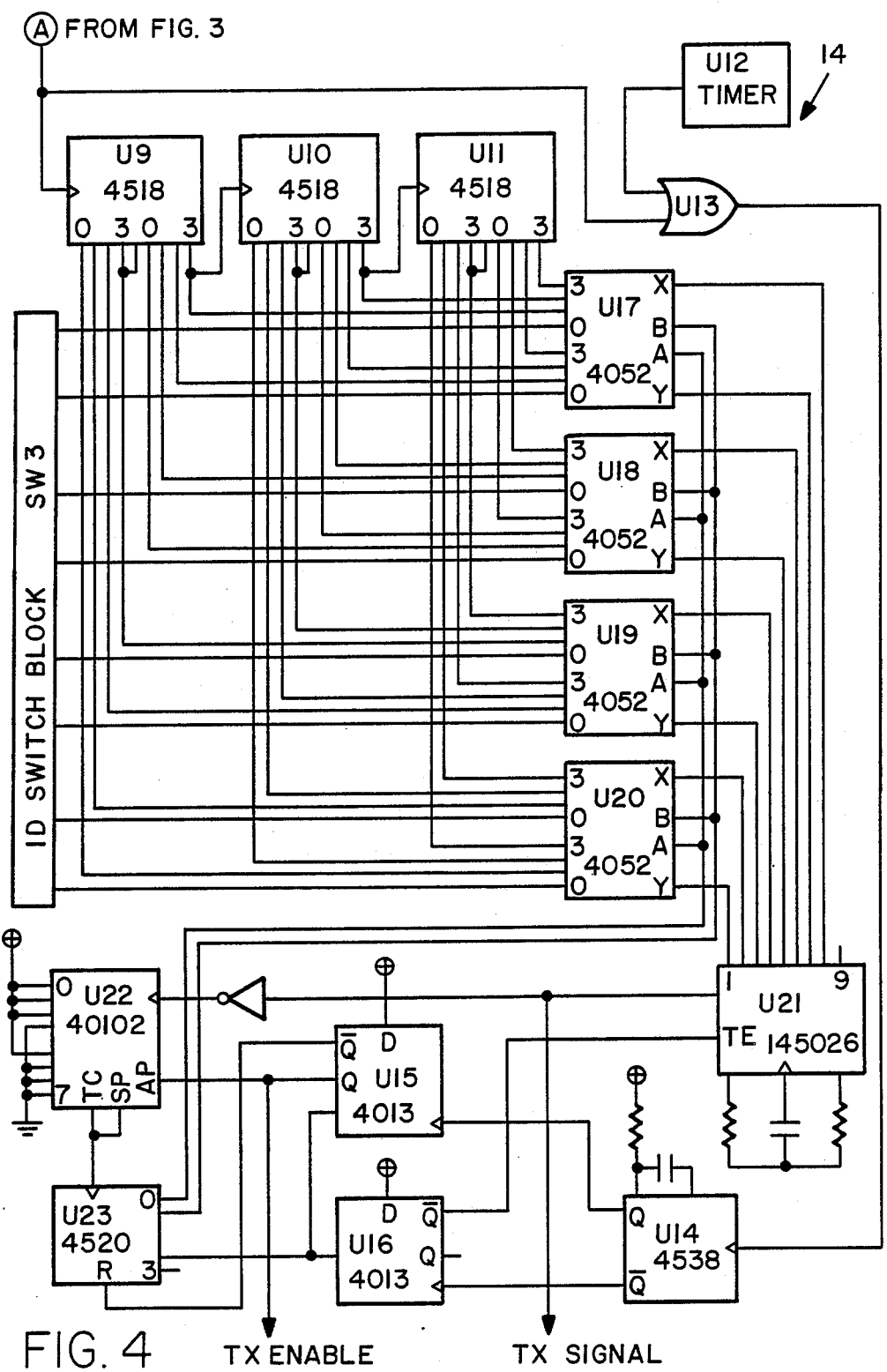
FIG. 4 is a circuit diagram of the binary counting portion of the tested embodiment of the present invention.

The scaling circuit 24 is incorporated to accommodate various sizes of water meters. It could, of course, be omitted from a specialized circuit; but, is preferred for a universally adaptable unit. The scaling circuit 24 consists of ICs U6 and U7, gate U8, and associated circuitry. It is a programmable divide-by-N counter capable of dividing the incoming frequency by a value as great as 999. Switch blocks SW1 and SW2 set the desired divide-by value. Pulses produced by the zero-cross detector 22 and divided down by the scaling circuit 24 are input to the counter 26 as shown in detail in FIG. 4. The counter 26 consists of ICs U9, U10, and U11 configured as a six-digit BCD counter. The counter rolls over when its six-digit capacity is exceeded.

When the RF transmission is started, the six-digit output of counter 26 must be converted to properly encoded serial format and must be multiplexed with the unit ID code, which is transmitted as a preamble and identifier for the counter data. Parallel-to-serial conversion is performed by ICs U13 through U23 in FIG. 4. The parallel output lines of the counter circuits U9, U10, and U11 and the ID switch block SW3 are input to ICs U17, U18, U19, and U20, which are 4-to-1 analog multipliers that sequentially route the counter output into the parallel input lines of the encoder U21. In the tested prototype embodiment, U21 is a Motorola ® MC14526 encoder, which accepts nine bits of data, encodes it using a time code modulation scheme, and serially sends the data as the "TX" signal to the FSK modulator and transmitter 30 upon receipt of a transmit enable level at the TE input (active low). Input data consists of eight parallel bits; the ninth bit input to U212 (B9) is kept at a fixed level. In addition to driving the modulator and transmitter 30, the "TX" signal output by U21 is used to clock counter U22, which is configured as a divide-by-18 circuit. Since the encoding scheme of encoder U21 generates two pulses for every data bit, the output of counter U23 is advanced every time a full nine-bit word is transmitted. Output lines Q0 and Q1 of U23 are routed to the "select" lines of the multiplexer. In this way, U17 through U20 will first route the ID code into U21, followed by the outputs of U9, U10, and U11.

The transmit sequence described above is triggered every time the flow counter 26 is incremented as well as periodically whenever timer U12 generates a pulse. The output of gate U13 triggers monostable multi-vibrator U14, which is programmed to generate a pulse of about 100 milliseconds. The Q output of multi-vibrator U14 clocks flip-flop U15, which generates a level (TX ENABLE) that turns on the RF transmitter. The positive edge of the signal on the Q output of multi-vibrator U14, which occurs 100 milliseconds later, starts the parallel-to-serial conversion sequence described above. The 100-millisecond delay is the "attack time" of the RF transmitter.

Figure 5:
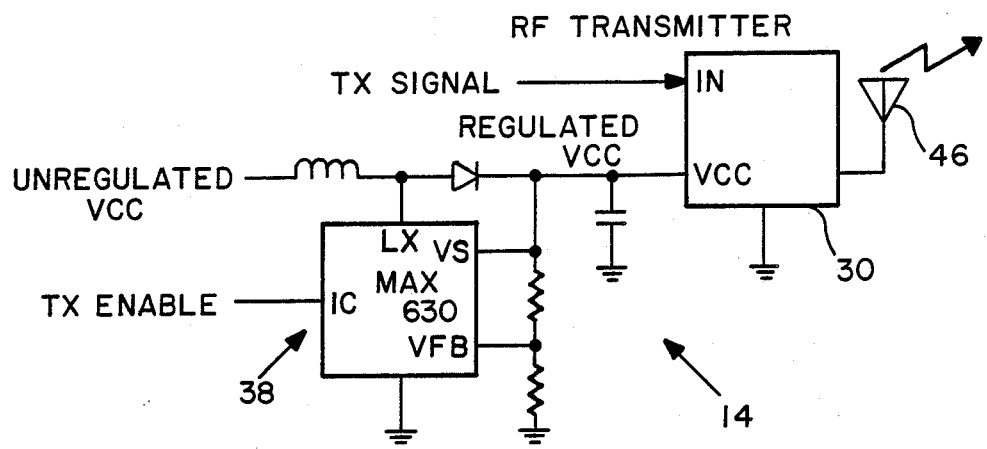
FIG. 5 is a circuit diagram of the voltage regulating and transmitting portion of the tested embodiment of the present invention.

With reference to FIG. 5, the data transmitter 30 employed in the tested embodiment is an off-the-shelf subminiature hybrid FSK transmitter. It is designed for operation in the 72–76 MHz band with a power output below two watts, as required by FCC regulations Part 90 for telemetry applications. The transmitting antenna 46 is a flexible loop designed to be secured beneath the pit cover wherein the water meter and remote flow sensor unit 14 of the present invention are located. The DC voltage supply to the transmitter is regulated by a micropower CMOS DC-to-DC converter 38. The output of the converter 38 provides a well-regulated 9.00 V DC with input voltage variations from 2 to 5 V DC. This regulator is turned on by the "TX ENABLE" signal from U15 only for the time that a transmission is required. During the rest of the time, the regulator, i.e. converter 38, is turned off and consumes no power. With respect to power, the novel method of power production employed by the present invention to allow its unattended operation in locations providing no power source will now be described in detail.

Even though thermoelectric conversion is not as efficient as other techniques such as photovoltaics, and the like, the inventors herein decided upon a power source based on thermoelectric conversion because of the unique characteristics of the water meter environment which make this technique uniquely effective, at least in the western United States where it is common practice for water meters to be located outdoors near the street in a pit covered by a concrete or metal lid. The pit environment is dark, ruling out photovoltaics, and is subject to outdoor diurnal temperature variations, providing the temperature differentials required for thermoelectric conversion. Upon investigation by the inventors, it was found that worst-case temperature differentials in that environment are sufficient to provide the 90 microwatts of power needed by the automated readout device of the present invention.

Figure 6:
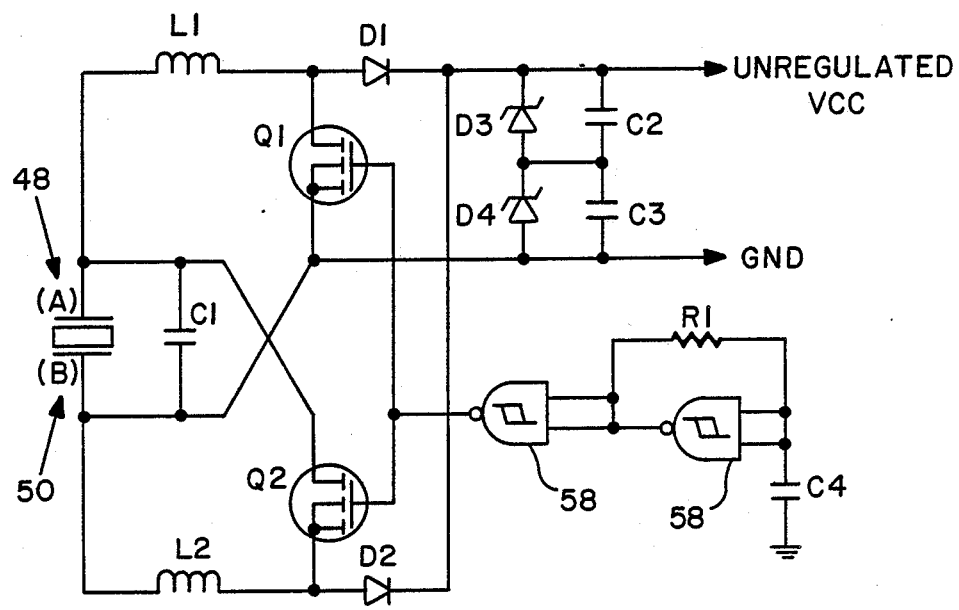
FIG. 6 is a circuit diagram of the thermoelectric generator portion of the tested embodiment of the present invention.

The thermoelectric generator of the present invention, shown in FIG. 6 and generally labelled therein as 48, is built around an off-the-shelf thermoelectric module 50 (Part No. CVP1.0-127-OSL) manufactured by Melcor in Trenton, N.J. The module 50 is shown in greater detail in FIG. 7. Modules of this type are used extensively as thermoelectric coolers by application of the Peltier effect, and are therefore sometimes referred to as "Peltier devices". In the present invention, the thermoelectric module 50 is used in the opposite manner by means of the so-called Seebeck effect, i.e. the direct conversion of heat flow into electricity. The thermoelectric module 50 used in the tested embodiment of the present invention consisted of 127 bismuth-telluride elements 52 stacked between two ceramic plates 54 connected in series electrically and in parallel thermally. This device provides a voltage proportional to the temperature differential between the two ceramic plates 54, typically 50 mV per degree Centigrade.

By itself in ambient temperature, the thermoelectric module 50 produces no electricity, since both its faces (i.e. the two ceramic plates 54) are at the same temperature. To affect a temperature differential between the two faces in the present invention, the module 50 is sandwiched between two aluminum plates 56 of unequal mass and surrounded by insulation 57 as shown in FIG. 7. In the tested embodiment, both plates 56 measured 5" by 3"; but, plate (A) is 0.05" thick, while plate (B) is ten times thicker (0.5") and, thus, has a mass ten times greater. Since the thermal time constant is proportional to mass, plate (B) has a considerably larger constant than plate (A). In addition, plate (B) is connected in tight thermal contact to the water meter itself. The thermal time constant of the water meter, of course, is vastly increased by its thermal contact with a huge network of water pipes and the water flowing through them. As temperature changes in the meter pit through the course of the day and night, plate (A) responds much more quickly than plate (B), creating the temperature differential required for the production of electrical power. Power is stored in capacitors C1 and C2, which, in the preferred embodiment, are so-called "double-layer" types employing recently developed technology that offers extremely low leakage rates. It was determined that when fully charged, capacitors C1 and C2 will power the system for two weeks without requiring recharge. With these low leakage capacitors, the novel thermoelectric generator 48 of the present invention will reliably power the system even with an average temperature differential as low as 1° C. per half-hour a day.

Returning with particularity to FIG. 6, the thermoelectric module 50 develops a small voltage across its terminals proportional to the temperature differential between the aluminum plates 56. Since the temperature differential may be positive or negative, the voltage developed may be of either polarity. The associated unregulated conversion circuitry 36 of the thermoelectric generator 48 performs a DC-to-DC conversion, amplifying voltages of either polarity and applying the output in correct polarity to capacitors C2 and C3. Note that the "unregulated voltage" output is always positive.

The two Schmitt Trigger NAND gates 58 shown, together with capacitor C4 and resistor R1, generate a square wave which turns the two n-channel FETs Q1 and Q2 on and off. While Q1 is on, and assuming that side "A" of the module 50 is positive in relation to side "B", there will be a current flowing from side "A" through inductor L1 and transistor Q1 into side "B". If Q1 is on long enough, that current will reach a value of $I = V_{TE}/R_{net}$, where $V_{TE}$ = voltage across the thermoelectric generator and $R_{net} = R_{L1} + R_{Q1} + R_{TE}$ = total network DC resistance.

When Q1 is turned off, the current through inductor L1 can not be reduced instantaneously to zero, and, therefore, a large voltage spike develops across L1. At that point, current will flow from L1 through diode D1, capacitors C2, C3, and the module 50 back to L1. Thus, for every square wave cycle, energy is transferred from the module 50 to inductor L1 during the first half of the cycle and from L1 to C2 and C3 during the second half. When voltage across the module 50 is reversed, the functions previously described for Q1 and L1 are performed by Q2 and L2. When transistor Q2 is turned off, current flowing through inductor L2 continues to flow through diode D2 and capacitors C2 and C3, thus charging C2 and C3 with the same polarity as before. Capacitors C2 and C3 must have a very high capacitance in order to maintain the output voltage for relatively long periods during which there may be no temperature differential across the module 50. In the tested prototype, Maxcap ® double layer capacitors, manufactured by Sohio, were used. Each cylindrical capacitor of 1.4" diameter by 0.6" height has a capacitance of 1.0 farad and is rated at 5.5 volts. Two capacitors were connected in series in the prototype to provide a maximum output voltage of eleven volts. Zener diodes D3 and D4 are provided to protect the capacitors against overvoltage Note that the oscillator consisting of the two Schmitt Trigger NAND gates 58 and implemented with a CMOS 4093 integrated circuit is powered by the output voltage of the capacitors. Therefore, the output capacitors must be precharged in order to start up the circuit; however, a very low voltage differential across the module 50 is sufficient to keep the circuit running once it is started. Since the 4093 integrated circuit can operate at voltages below three volts, transistors Q1 and Q2 should be low-threshold n-channel FETs with a low ON resistance. Supertex ® D102 transistors were used in the prototype. Additionally, inductors L1 and L2 must have high Q to minimize losses. It can be shown that the energy transfer from the module 50 to the output is maximized for a given value of L if the oscillator is set to a frequency given by $f = R_{net}/2.52L$. In the prototype, $R_{net}$ was measured and found to be approximately 7.5 ohms. The inductor value was 3-mH and the oscillator frequency was set to .1 kHz.

Turning now to FIGS. 8 and 9, the preferred local system for each meter site employing the above-described, flow sensor unit 14 will now be described. As depicted in FIG. 8 the magnetic flux sensor coils 16 are input to flow counting circuitry generally indicated as 60 which provides flow data to a transmitter generally indicated as 62 from whence it is transmitted to a local receiver/telephone modem 10 or a receiver/RF modem 12 serving multiple units 14 (e.g. up to 10,000) as previously mentioned with respect to FIG. 1. The modems 10 and 12 are easily assembled from off-the-shelf electronic components and, therefore, are not considered to be points of novelty, per se, of the present invention. Additionally in the preferred embodiment, however, the data being output by the flow counting circuitry 60 is also provided to a history and display logic 64 containing memory 66. The history and display logic 64 keeps a history of the data in the memory 66 and performs calculations on the data to provide information of interest to the consumer. As previously mentioned, this can be in the form of water use for the day, week, month, etc. as well as comparisons of such previously calculated figures as saved in the memory 66 for such comparison purposes. The history and display logic 64 outputs its data, on request, to a display unit 68 containing a liquid crystal display panel 70, or the like, capable of displaying alpha-numeric information to the consumer and a function selection switch 72, or the like, by means of which the consumer can cause information of interest in the memory 66 to be calculated and/or displayed. The history and display logic 64 and the display unit 68 can be located at a distance from the sensor unit 14 (as in the consumer's house) and the information from the flow counting circuitry 60 received by a local receiver 74 located with the logic 64 and unit 68; or, optionally, the history and display logic 64 and the display unit 68 can be wired to the flow counting circuitry 60 and a thermoelectric generator 48 as depicted in FIG. 9. The configuration of FIG. 8 is the preferred embodiment of the inventors herein. Of course, in such case a separate power supply must be provided for the local receiver 74, the logic 64, and unit 68; however, such power is generally readily available within the house or other convenient location as wherein the informational apparatus would be most desirably located.

Thus, it can be seen that the present invention has achieved its stated objectives by providing an individual sensing and transmitting unit that can be mounted on or adjacent to a water meter or the like with no modification being required to the meter. The sensing and transmitting units are inexpensive to build and operate and interface wirelessly with local interface units to form a regional system of sensing units monitoring as many as 10,000 meters within a radius of approximately one mile of each interface unit wherein each interface unit then multiplexes the data for is interfacing sensing units to a central billing site over telephone lines, CATV cable, or an RF link.

Wherefore, having thus described our invention, what is claimed is:

1. In a meter measuring consumption of an item and having a case with a rotating magnet therein producing a magnetic field moving at a rate proportional to the consumption of the item, the improvement for remotely reading data from outside of the meter without physically invading or modifying the meter comprising:
   (a) sensor means disposed outside of the case for sensing a portion of the magnetic field passing through the case and for providing an electrical signal proportional to the rate of movement of the magnetic field;
   (b) consumption calculation means connected to receive said electrical signal for producing a binary count of the consumption of the item;
   (c) transmitter means for wirelessly transmitting said binary count; and,
   (d) receiver means for receiving said wirelessly transmitted binary count and for transmitting said received binary count to a central site which uses the data.

2. The improvement to a meter of claim 1 wherein: said receiver means includes modem means for transmitting said received binary count to said central site by means of telephone lines.

3. The improvement to a meter of claim 1 wherein: said receiver means includes modem means for transmitting said received binary count to said central site by means of a CATV cable.

4. The improvement to a meter of claim 1 wherein: said receiver means includes RF modem means for transmitting said received binary count to said central site by means of a radio frequency link.

5. The improvement to a meter of claim 1 wherein: said receiver means includes means for receiving said wirelessly transmitted binary count from a plurality of said transmitter means and for multiplexing the transmitting of said received binary counts to a central site which uses the data.

6. The improvement to a meter of claim 1 and additionally comprising:
   consumer consumption information display means for receiving and keeping a history of said binary count of the consumption of the item from said consumption calculation means and for calculating and displaying consumption information from said history upon request, said consumer consumption information display means including local receiver means for receiving said binary count as transmitted by said transmitter means.

7. The improvement to a meter of claim 1 and additionally comprising:
   thermoelectric generation means for providing power to said consumption calculation means and said transmitter means from changes in temperature at the location of said consumption calculation means and said transmitter means.

8. The improvement to a meter of claim 7 wherein said thermoelectric generation means includes:
   (a) a plurality of thermoelectric elements disposed between a pair of contact plates in series electrically and in parallel thermally;
   (b) a first heat sink member thermally connected to one of said pair of contact plates; and,
   (c) a second heat sink member thermally connected to the other of said pair of contact plates, said second heat sink member being of a different mass than said first heat sink member.

9. The improvement to a meter of claim 8 wherein: said second heat sink member is thermally attached to the body of the meter whereby the body of the meter acts as an additional heat sink to said other of said pair of contact plates.

10. A sensor/transmitter unit for non-invasively mounting in association with a water meter measuring consumption of water and including a case containing a coupling magnet producing a magnetic field rotating at a rate proportional to the water consumption rate and for transmitting consumption data for remote reading of the meter comprising:
   (a) magnetic flux sensor means disposed outside of the case for sensing a portion of the magnetic field passing through the case and for providing a signal proportional to the rate of rotation of the magnetic field;
   (b) consumption calculation means connected to receive said signal for producing a binary count of the water consumption; and,
   (c) transmitter means for wirelessly transmitting said binary count.

11. The sensor/transmitter unit of claim 10 and additionally comprising:
   receiver means for receiving and wirelessly transmitted binary count and for transmitting said received binary count to a central site employing the data, said receiver means including means for receiving said wirelessly transmitted binary count from a plurality of said transmitter means and for multiplexing the transmitting of said received binary counts to a central site which uses the data.

12. The sensor/transmitter unit of claim 10 and additionally comprising:
   consumer consumption information display means for receiving and keeping a history of water consumption and for calculating and displaying consumption information from said history upon request, said consumer consumption information display means including local receiver means for receiving said binary count as transmitted by said transmitter means.

13. The sensor/transmitter unit of claim 10 and additionally comprising:
   thermoelectric generation means for providing power to said consumption calculation means and said transmitter means from changes in temperature at the location of said consumption calculation means and said transmitter means.

14. The sensor/transmitter unit of claim 13 wherein said thermoelectric generation means includes:
   (a) a plurality of thermoelectric elements disposed between a pair of contact plates in series electrically and in parallel thermally;
   (b) a first heat sink member thermally connected to one of said pair of contact plates; and,
   (c) a second heat sink member thermally connected to the other of said pair of contact plates, said second heat sink member being of a different mass than said first heat sink member.

15. The sensor/transmitter unit of claim 14 wherein: said second heat sink member is thermally attached to the body of the meter whereby the body of the meter acts as an additional heat sink to said other of said pair of contact plates.

16. A self-powered sensor/transmitter unit for attachment to a water meter for transmitting water consumption data to allow remote reading of the meter comprising:
   (a) sensor means for sensing a component of the water meter moving in proportion to the rate of water consumption and for providing a signal proportional to the rate of rotation of said component;
   (b) consumption calculation means connected to receive said signal for producing a binary count of the water consumption;
   (c) transmitter means for transmitting said binary count; and,
   (d) thermoelectric generation means for providing power to said consumption calculation means and said transmitter means from changes in temperature at the location of the water meter.

17. The sensor/transmitter unit of claim 16 wherein said thermoelectric generation means includes:
   (a) a plurality of thermoelectric elements disposed between a pair of contact plates in series electrically and in parallel thermally;
   (b) a first heat sink member thermally connected to one of said pair of contact plates; and,
   (c) a second heat sink member thermally connected to the other of said pair of contact plates, said second heat sink member being of a different mass than said first heat sink member.

18. The self-powered sensor/transmitter unit of claim 17 wherein:
   said second heat sink member is thermally attached to the body of the water meter whereby the body of the meter acts as an additional heat sink to said other of said pair of contact plates.

19. The self-powered sensor/transmitter unit of claim 18 and additionally comprising:
   a low leakage rate capacitor connected to receive and store surges of electrical energy produced by said plurality of thermoelectric elements and release the stored energy slowly as needed to power the sensor/transmitter.

20. The self-powered sensor/transmitter unit of claim 16 wherein said component is a rotating coupling magnet producing a rotating field of magnetic flux and said sensor means comprises a coil of wire positioned to produce an electrical signal each time it is cut by said rotating field of magnetic flux.

21. The self-powered sensor/transmitter unit of claim 16 and additionally comprising:
   receiver means for receiving said transmitted binary count and for re-transmitting said received binary count to a central site using the data.

22. The self-powered sensor/transmitter unit of claim 21 wherein:
said receiver means includes means for receiving said wirelessly transmitted binary count from a plurality of said transmitter means and for multiplexing the transmitting of said received binary counts to a central site which uses the data.

23. The self-powered sensor/transmitter unit of claim 16 and additionally comprising:
consumer consumption information display means for receiving and keeping a history of water consumption and for calculating and displaying consumption information from said history upon request.

24. A thermo-electric generator for providing power to low-power devices at remote locations from changes in temperature at the location of a device incorporating the generator comprising:
(a) a plurality of thermo-electric elements disposed between a pair of contact plates in series electrically and in parallel thermally;
(b) a first heat sink member thermally connected to one of said pair of contact plates; and,
(c) a second heat sink member thermally connected to the other of said pair of contact plates, said second heat sink member being of a different mass than said first heat sink member.

25. The thermo-electric generator unit of claim 24 wherein:
the device has a thermally conductive body portion and said second heat sink member is thermally attached to said body portion whereby said body portion of the device acts as an additional heat sink to said other of said pair of contact plates.

26. The thermo-electric generator unit of claim 24 and additionally comprising:
a low leakage rate capacitor connected to receive and store surges of electrical energy produced by said plurality of thermo-electric elements and release the stored energy slowly as needed to power a device incorporating the generator.

27. The thermo-electric generator unit of claim 24 wherein:
(a) said thermoelectric elements are made of bismuth-telluride;
(b) said contact plates are ceramic; and,
(c) said heat sink members are aluminum.

28. A system of remotely and non-invasively monitoring and reading consumption data from a plurality of water meters each including a case having a coupling magnet therein producing a magnetic field rotating at a rate proportional to the water consumption rate comprising:
(a) a plurality of sensor/transmitter units for mounting outside of the case in association with respective ones of the water meters, each said sensor/transmitter unit comprising:
(a1) magnetic flux sensor means for sensing a portion of the magnetic field passing through the case and for providing a signal proportional to the rate of rotation of the magnetic field,
(a2) consumption calculation means connected to receive said signal for producing a binary count of the water consumption, and
(a3) transmitter means for wirelessly transmitting said binary count; and,
(b) receiver means for receiving said wirelessly transmitted binary count from said sensor/transmitter units and for transmitting said received binary count to a central site employing the data.

29. The system of claim 28 wherein:
said receiver means includes means for multiplexing the transmitting of said received binary counts to a central site which uses the data.

30. The system of claim 28 wherein at least one said sensor/transmitter unit additionally comprises:
consumer consumption information display means for receiving and keeping a history of water consumption and for calculating and displaying consumption information from said history upon request, said consumer consumption information display means including local receiver means for receiving said binary count as transmitted by said transmitter means.

31. The system of claim 28 wherein each said sensor/transmitter unit additionally includes:
thermoelectric generation means for providing power to said consumption calculation means and said transmitter means from changes in temperature at the location of said consumption calculation means and said transmitter means.

32. The system of claim 28 wherein
(a) said transmitter means includes means for randomly and periodically sending said binary count of consumption calculation data to said receiver means; and,
(b) said receiver means includes means for storing and accumulating said consumption calculation data until it is transmitted to said central site.

33. A system for remotely monitoring and reading consumption data from a plurality of utility meters each including a component moving in proportion to the consumption of an associated utility item comprising:
(a) a plurality of sensor/transmitter units for mounting in association with respective ones of the meters, each said sensor/transmitter unit comprising,
(a1) sensor means for sensing movement of the component and for providing a signal proportional thereto,
(a2) consumption calculation means connected to receive said signal for producing a binary count of the consumption of the associated utility item, and
(a3) transmitter means for wirelessly transmitting said binary count; and,
(b) receiver means for receiving said wirelessly transmitted binary count from said sensor/transmitter units and for transmitting said received binary count to a central site, said receiver means including means for multiplexing the transmitting of said received binary counts to said central site.

* * * * *